Sept. 7, 1943.  A. I. YEALDHALL ET AL  2,328,872
INSTANTANEOUS BEVERAGE CUP
Filed June 23, 1942
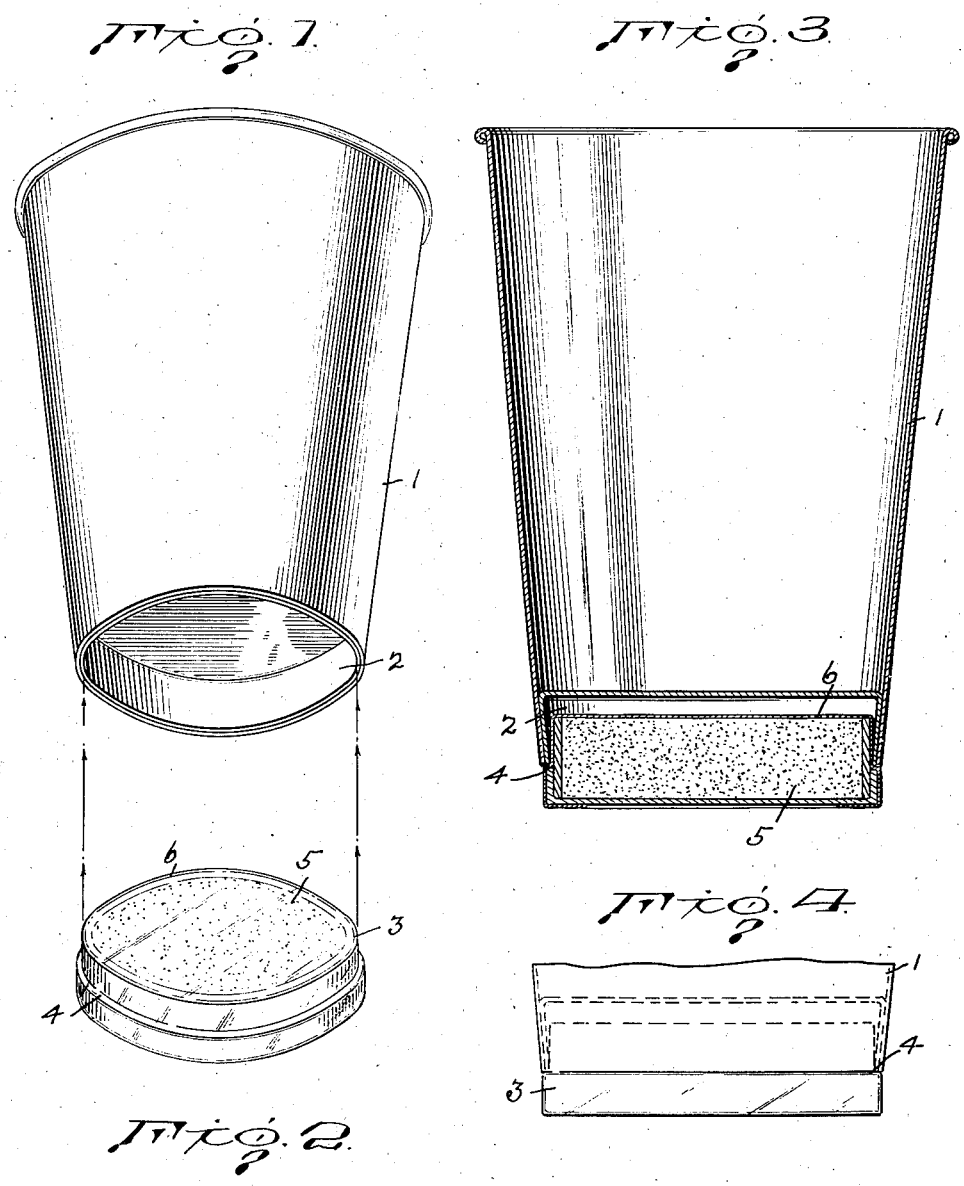

Patented Sept. 7, 1943

2,328,872

UNITED STATES PATENT OFFICE 2,328,872

INSTANTANEOUS BEVERAGE CUP

Aulbrey I. Yealdhall and Albert W. Kelly, Baltimore, Md.

Application June 23, 1942, Serial No. 448,128

2 Claims. (Cl. 206—47)

This invention relates to an improved instantaneous beverage cup, and has for its object to provide a cup formed of paper, or other suitable material, having a removable composition holding receptacle that fits into, and is held securely in, a cavity in the lower end of the cup and in which is held a powdered or other prepared beverage, such as coffee, that can be mixed with water, hot or cold, in the cup for the purpose of drinking.

The invention consists of the novel construction and arrangement of the parts and combination of parts hereinafter more fully set forth in the following specification and pointed out in detail in the appended claims.

In the accompanying drawing—

Figure 1 is a perspective view of the cup with the composition holding receptacle removed.

Figure 2 is a perspective view of the composition holding receptacle.

Figure 3 is a vertical longitudinal section of the cup with the composition holding receptacle in position in the lower end thereof.

Figure 4 is a detail elevation of the lower end of the cup and composition holding receptacle.

Referring to the accompanying drawing, forming part of this specification, and in which like reference numerals designate like parts throughout the several views thereof, I designates a cup which may be made of paper, or other suitable material, and has a cavity 2 formed in its lower end, by pressing the lower end of the cup inwardly, or by inserting a separate piece in the lower end of the cup. A composition holding receptacle 3 is formed with an annular shoulder 4 which impinges against the lower end of the cup I when the receptacle 3 is inserted in the cavity 2 in the lower end of the cup I. The composition holding receptacle is held securely in the cavity 2 by friction or by waxing the impinging parts. The material 5 to be used, is placed in the receptacle 3 and is held therein by a covering of Cellophane 6 or other suitable material. The annual shoulder 4 limits the distance the composition receptacle 3 is to be pushed into the cavity 2 in the lower end of the cup I. When it is desired to use the composition 5 the receptacle is easily removed from the cavity in the lower end of the cup I by grasping the lower projecting end of the receptacle 3 and pulling it out. The Cellophane 6 is then removed and the contents 5 poured into the cup I and then add the hot or cold water in the cup forming a drinking beverage. The water used may be hot or cold according to the particular beverage being made.

Having thus described our invention, what we claim is:

1. A beverage cup of the class described comprising a conical body portion having a circular internally depressed cavity at its lower end, said cavity having side walls relatively straight, and a circular composition receptacle form to fit neatly within the walls of the cavity with an externally extending portion with its wall enlarged to strike against the lower edge of the said walls and limit the movement of the receptacle within same and space the top of same away from the bottom of the cup, said receptacle being shaped to form the base for resting the cup on prior to the use of the contents of the receptacle in the cup for beverage purposes.

2. A beverage cup of the class described comprising a body portion having an internally depressed cavity at its lower end, said cavity having side walls relatively straight, and a composition receptacle form to fit neatly within the walls of the cavity with an externally extending portion with its walls enlarged to strike against the lower edge of the said walls and limit the movement of the receptacle within same and space the top of same away from the bottom of the cup, said receptacle being shaped to form the base for resting the cup on prior to the use of the contents of the receptacle in the cup for beverage purposes, and composition in the receptacle arranged for facile removal therefrom for insertion with the cup.

AULBREY I. YEALDHALL.
ALBERT W. KELLY.